3,256,242
AROMATIC CHLOROISOPHTHALATE
POLYESTERS
Paul Winthrop Morgan, West Chester, Pa., assignor to
E. I. du Pont de Nemours and Company, Wilmington,
Del., a corporation of Delaware
No Drawing. Filed Nov. 14, 1962, Ser. No. 237,757
1 Claim. (Cl. 260—47)

This invention relates to novel chlorine-containing aromatic polyesters, as well as to fibers, films, and other shaped articles produced therefrom.

Numerous synthetic linear condensation polyesters have been evaluated in recent years in attempts to develop fiber-and-film forming polymers of outstanding qualities. The goal has been to achieve a polymer having a balance of good properties, since for most uses a serious deficiency in one property more than offsets outstanding performance in some other respect. Among the important properties is the melting point of the polymer, which should be at least about 200° C. for polymers to be employed in the extrusion of fibers or films. Another important property, which is frequently lacking among highly aromatic polymers, is good stability upon exposure to light, particularly exposure to daylight. A desirable property for fibers intended for use in "wash-and-wear" garments, a fiber market of growing importance, is good recovery from tensile strain.

In accordance with the present invention, polyesters are provided which are characterized by the presence of recurring units of a chloroisophthalic acid esterified with a bishydroxyphenyl compound. Accordingly, linear polyesters of the invention may be illustrated as possessing recurring units of the following structural formula:

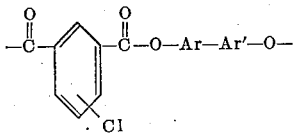

in which the chlorine atom may be attached to any position of the isophthalate radical; and wherein Ar and Ar' represents arylene radicals which may be the same or different.

The starting material acid for preparing the polyesters of the invention may be any one of the chloroisophthalic acids, i.e., 5-chloroisophthalic acid, 4-chloroisophthalic acid, or 2-chloroisophthalic acid. The 5-chloroisophthalic and 4-chloroisophthalic acids are preferred.

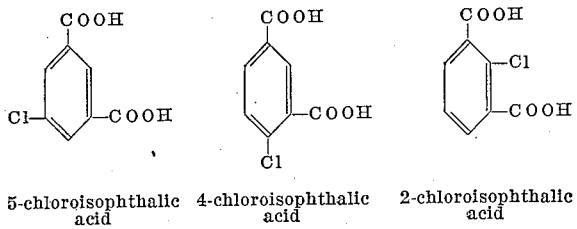

5-chloroisophthalic   4-chloroisophthalic   2-chloroisophthalic
acid                  acid                  acid In place of the free acids, the starting materials for the polyesters may comprise their ester-forming derivatives, e.g., their acid halides, esters, or other compounds containing functional groups equivalent to the carboxyl group in their ability to react with a hydroxyl group or its derivatives.

To form the polyesters, the chloroisophthalic acids or derivatives thereof are reacted with a bishydroxyphenyl compound of 12 to 20 carbon atoms represented by the formula HO—Ar—Ar'—OH, wherein the hydroxyl substituents are attached to different rings of a divalent aromatic group —Ar—Ar'— having two to three carbocyclic aromatic rings and free from aliphatic unsaturation. In place of the dihydroxy compound, its ester-forming derivatives may be employed, i.e., compounds containing functional groups equivalent to the hydroxyl group in their ability to react with the carboxyl group, such as esters of the dihydroxy compound. Particularly useful are the acetate ester, or esters of other aliphatic acids having relatively few carbon atoms. Suitable examples of bishydroxyphenyl compounds which may be employed include 2,2-bis(4-hydroxyphenyl)propane,
2,2-bis(3-chloro-4-hydroxyphenyl)propane,
2,2-bis(3,5-dichloro-4-hydroxyphenyl)propane,
4,4'-dihydroxybiphenyl,
3,3'-dichloro-4,4'-dihydroxybiphenyl,
3,3'-dibromo-4,4'-dihydroxybiphenyl,
3,3'-difluoro-4,4'-dihydroxybiphenyl,
3,3',5,5'-tetrachloro-4,4'-dihydroxybiphenyl,
Bis(4-hydroxyphenyl)methane,
Bis(4-hydroxyphenyl)ethane,
Bis(4-hydroxyphenyl)ether,
Bis(4-hydroxyphenyl)sulfone,
Bis(4-hydroxyphenyl)ketone,
Bis(4-hydroxyphenyl)sulfoxide,
1,2-bis(4-hydroxyphenoxy)ethane, and Bishydroxylphenyl compounds containing a heterocyclic ring, such as bis(4-hydroxyphenyl)oxindole, phenolphthalein, and phenolphthalimidine.

The divalent —Ar—Ar'— group is composed primarily of carbon and hydrogen free from aliphatic unsaturation and is preferably a hydrocarbon radical or halohydrocarbon radical. It may also contain other atoms, such as nitrogen or chalkogen atoms; thus, the repeating units may contain ether, carbonyl, sulfide, sulfoxide, sulfonyl, amide, cyano, ester or anhydride radicals or groupings. Mixtures of dihydroxy compounds may be employed.

As used herein, the term "polyester" is intended to include not only homopolyesters but also copolyesters, terpolyesters, and the like.

While the preferred embodiment of the invention comprises polyesters in which all, or substantially all (i.e., greater than 90%), of the recurring structural units consist of chloroisophthalic acid esters of bishydroxyphenyl compounds, it is to be understood that the invention also comprises polyesters in which residues of other acids are present. In general, at least about 50 mol percent of the acid component of the polyester is a chloroisophthalic acid, although of course smaller proportions can be employed. By "acid component" of the polyester is meant the sum of all the carboxylic acids which would be formed by hydrolysis of the carbonyloxy linkages in the polymer chain. The remainder of the acid component of the polyester may be any suitable dicarboxylic acid or hydroxycarboxylic acid. Examples of such compounds include bibenzoic acid, 3,3'-dimethylbibenzoic acid, isophthalic acid, terephthalic acid, 4,4'-stilbenedicarboxylic acid, 1,1- and 1,2-bis(4-carboxyphenyl)ethane, bis-4-carboxyphenyl ether, bis-4-carboxyphenyl sulfone, 2,8-dibenzofurandicarboxylic acid, hexahydroterephthalic acid, oxalic acid, 4-hydroxybenzoic acid, and 3-chloro-5-hydroxybenzoic acid. The copolymeric acids may be hydrocarbon dicarboxylic acids or hydroxycarboxylic acids, or they may contain other modifying groups such as halogen groups, chalkogen groups, or other groups as described above with respect to the dihydroxy compound.

The novel polyesters of the invention may be prepared by any of a variety of polycondensation methods described in the prior art. For example, polycondensation through transesterification may be carried out by reacting the diacetate of a bishydroxyphenyl compound with a dicarboxylic acid at elevated temperature and reduced pressure in the presence of a catalyst such as sodium acetate; or the dihydroxy compound may be reacted with the diphenyl ester of the dicarboxylic acid in the presence of sodium acetate. The desired polyester may also be prepared by reacting the appropriate bishydroxyphenyl compound with the appropriate diacid chloride, and this method is indeed particularly preferred when either the acid chloride or the dihydroxy compound contains a group desired in the polyester product but which would be reactive in a transesterification reaction; for instance, an ester group or anhydride group. The acid chloride and the dihydroxy compound are reacted in substantially equimolar quantities under suitable conditions, e.g., at high temperature (150–250° C.) in an inert solvent, or at lower temperatures with the addition of a tertiary amine as an acid acceptor, preferably with strong agitation. The polyesters may also be prepared by an interfacial polymerization procedure by dissolving the dihydroxy compound in aqueous alkali, dissolving the diacid chloride in a water-immiscible organic solvent, adding a catalyst such as a quaternary ammonium salt, and combining the two phases with vigorous agitation.

The following examples will serve to illustrate the preparation and properties of the novel polyesters of the invention, although they are not intended to be limitative.

The term "inherent viscosity," as used herein, is defined as the polymer property determined in accordance with the following relationship:

$$\eta_{inh} = \frac{\ln \eta_{rel}}{c}$$

wherein the relative viscosity, $\eta_{rel}$, is calculated by dividing the flow time in a capillary viscometer of a dilute solution of the polymer by the flow time for the pure solvent. The concentration ($c$) used in the examples is 0.5 gram of polymer per 100 ml. of solution, and the measurements are made at 30° C. The solvent employed in the examples comprises a mixture of 40 weight percent sym-tetrachloroethane and 60 weight percent phenol.

acetone, filtered off, washed with water, and finally washed with a mixture of water and alcohol.

*Method B.*—A cold solution of 0.0125 mol of 2,2-bis (4-hydroxyphenyl)propane, 4 g. of sodium hydroxide, 1.0 g. of tetraethylammonium chloride, and 120 ml. of water is placed in a high powered agitator (Waring Blendor). A solution comprising 30 ml. of 1,1,2-trichloroethane and 0.0125 mol of the acid chloride of the starting material acid shown in the table is added with rapid agitation. Five ml. of solvent is used as a rinse. The mixture is stirred 10 minutes and then diluted with hexane. The precipitated polymer is collected, washed, and dried.

In the preparation of the 4-chloroisophthalate/isophthalate copolyester shown in the table, 0.00625 mol of each of the corresponding acid chlorides are dissolved in 30 ml. of the trichloroethane and the mixture is added to the 2,2-bis(4-hydroxyphenyl)propane solution. A similar copolyester is formed by using a mixture of 0.00625 mol each of the acid chlorides of 5-chloroisophthalic acid and isophthalic acid.

As used herein, the "polymer-melt temperature," abbreviated "PMT," is defined as that temperature where a polymer sample becomes molten and leaves a trail when moved across a hot metal surface with moderate pressure. Practical considerations in PMT determinations are discussed by Sorenson and Campbell in "Preparative Methods of Polymer Chemistry," Interscience Publishers, Inc., New York, pages 49–50 (1961).

In the table, the column entitled "Form" indicates the form in which the polymer is tested for color stability, the results for which are given in the last column. Film preparation is carried out by standard techniques of melt pressing or solvent casting from solution in 1,1,2-trichloroethane (TCE) or tetrahydrofuran (THF). The terephthalate polyester is tested in powder form owing to the difficulty of forming films from the polymer. The color stability is evaluated by exposing the polymers to a carbon arc source high in ultraviolet light ("Fade-O-meter") and observing the time required to effect a change in color of the polymers.

TABLE I.—POLYESTERS OF 2,2-BIS(4-HYDROXYPHENYL)PROPANE

| | Starting Material Acid | Polymerization Method | Inherent Viscosity | PMT, ° C. | Form | Color Stability (Fade-O-meter) |
|---|---|---|---|---|---|---|
| 1 | 2-Chloroisophthalic Acid | A | 0.64 | 250 | Film from THF | Trace, 20 hrs.; pale yellow, 200 hrs. |
| 2 | 4-Chloroisophthalic Acid | A | 0.60 | 270 | Melt Pressed Film | Trace, 20 hrs.; pale yellow, 250 hrs. |
| 3 | 5-Chloroisophthalic Acid | A | 0.66 | 267 | do | Trace, 15 hrs.; pale yellow, 250 hrs. |
| 4 | 4-Chloroisophthalic Acid (50%). Isophthalic Acid (50%) | B | 0.63 | 257 | Film from TCE | Trace, 65 hrs.; pale yellow, 250 hrs. |
| 5 | Isophthalic Acid | A | 1.05 | 337 | Melt Pressed Film | Trace, 5 hrs.; deep yellow, 20 hrs. |
| 6 | Terephthalic Acid | B | 1.13 | >400 | Powder | Trace, 1.5 hrs.; deep yellow, 10 hrs. |
| 7 | Chloroterephthalic Acid | A | 0.95 | 310 | Melt Pressed Film | Trace, 1.5 hrs.; medium yellow, 24 hrs. |

*Example 1.—Polyesters and copolyesters of 2,2-bis(4-hydroxyphenyl)propane with chloroisophthalic acids and other acids*

In Table I are listed the results obtained from a series of polyesters prepared in accordance with one of the following variations of interfacial polymerization technique:

*Method A.*—A cold solution of 0.0125 mol of 2,2-bis (4-hydroxyphenyl)propane (2.854 grams), 4.88 ml. of caustic solution containing 0.2049 g. of sodium hydroxide per ml. of solution, 1.0 g. of tetraethylammonium chloride, 10 ml. of a 10% solution of sodium lauryl sulfate, and 110 ml. of water is placed in a high powered agitator (Waring Blendor). While rapidly agitating the solution a second solution is added, comprising 30 ml. of 1,1,2-trichloroethane and 0.0125 mol of the acid chloride of the starting material acid shown in the table. After 5 minutes of rapid agitation the polymer is precipitated with As shown in the table, the poly(isopropylidene-4,4'-diphenylene chloroisophthalate) polyesters and copolyesters exhibit good light stability in contrast to the corresponding chloroterephthalate, terephthalate, and isophthalate polyesters. Particularly noteworthy is the fact that, even when a trace of color appears in the chloroisophthalate polyesters, deepening of the color upon further exposure occurs only very slowly; while the other polyesters listed in the table exhibit not only early appearance of color but rapid intensification of the color.

*Example 2.—Poly(3,3',5,5'-tetrachloro-4,4'-biphenylene 5-chloroisophthalate)*

Following the general procedure of Method A of Example 1, 0.0125 mol of 3,3',5,5'-tetrachloro-4,4'-bisphenol is reacted with 0.0125 mol of 5-chloroisophthaloyl chloride. The product, poly(3,3',5,5'-tetrachloro-4,4'- biphenylene 5-chloroisophthalate), has an inherent viscosity of 0.69. The polymer remains solid when heated to 400° C. and above. A film cast from a solution of the polymer in tetrahydrofuran exhibits excellent color stability, 350 hours of exposure in the Fade-O-meter being required to develop even a trace of color in the polymer.

*Example 3.—Poly(isopropylidene-3,3',5,5'-tetrachloro-4,4'-diphenylene 5-chloroisophthalate)*

In a Waring Blendor is placed a cold solution comprising 3.66 g. (0.01 mol) of 2,2-bis(3,5-dichloro-4-hydroxy-phenyl)propane, 0.8 g. of sodium hydroxide, 1.0 g. of tetraethylammonium chloride, and 120 ml. of water. While the solution is rapidly stirred, a second cold solution of 2.38 g. (0.01 mol) of 5-chloroisophthaloyl chloride in 30 ml. of 1,1,2-trichloroethane is added rapidly, and rinsed into the reaction vessel with an additional 5 ml. of 1,1,2-trichloroethane. Rapid stirring is continued for a period of ten minutes, and the resulting polymer is precipitated by dilution of the reaction mixture with hexane. The product is collected by filtration, washed, and dried. The polymer has an inherent viscosity of 1.01 and a PMT of 330° C. A film cast from a solution of the polymer in tetrahydrofuran exhibits excellent color stability, no change in the color of the polymer being observed after 300 hours of exposure in the Fade-O-meter.

Using conventional techniques, filaments of the polymer are melt-spun at 330° C. and drawn 1.8× at 260° C. They have a denier per filament of 29.5, a tenacity of 2.03 g.p.d., an elongation of 43.4%, an initial modulus of 26.6 g.p.d., and a wash-set recovery angle of 325°. The wash-set recovery angle, a measure of the suitability of the fiber for use in wash-and-wear garments, is determined by bending a sample of yarn 360° around a 25 mil wire mandrel and placing the yarn under a load of 0.05 gram per denier. The yarn is then soaked for 2 minutes in a 60° C. detergent solution, rinsed with clear room-temperature water, and dried for a period of one to two hours at controlled conditions of temperature (21° C.) and relative humidity (15%). It is then removed from the mandrel and permitted to recover with no load under the same conditions of temperature and humidity. The wash-set recovery is reported as the angle through which the bent yarn recovers under the above conditions and is expressed in degrees, the maximum recovery possible being 360°.

*Example 4.—Melt preparation of poly(isopropylidene-3,3',5,5'-tetrachloro-4,4'-di-phenylene 5-chloroisophthalate)*

A mixture of 50.1 g. (0.25 mol) of 5-chloroisophthalic acid, 112.5 g. (0.25 mol) of 2,2-bis(3,5-dichloro-4-hydroxyphenyl)propane diacetate, and 0.2 g. of sodium acetate are placed in a flask equipped with a stirrer, a distilling head, and a nitrogen inlet. The flask is lowered into a Wood's metal bath at 200° C. and the temperature is raised to 265° C. over a period of one hour. A nitrogen sweep of 0.2 l./min. of nitrogen is maintained. During the first hour 22.5 ml. of acetic acid distills from the reaction mixture. A vacuum of 10–20 mm. of mercury is then applied, the nitrogen sweep being maintained. The resulting polymer, poly(isopropylidene-3,3',5,5'-tetrachloro-4,4'-diphenylene 5 - chloroisophthalate), is insoluble in the mixed tetrachloroethane phenol solvent. Its PMT is 355° C.

*Example 5.—5-chloroisophthalate/isophthalate copolyester with 2,2-bis(3,5-dichloro-4-hydroxyphenyl)propane*

Following the general procedure of Method A of Example 1, 0.0125 mol of 2,2-bis(3,5-dichloro-4-hydroxyphenyl)propane is reacted with a mixture of 0.01 mol of 5-chloroisophthaloyl chloride and 0.0025 mol of isophthaloyl chloride. The product has an inherent viscosity of 0.48 and a PMT of 323° C. A film cast from a solution of the polymer in tetrahydrofuran exhibits excellent color stability, no change in the color of the polymer being observed after 200 hours of exposure in the Fade-O-meter.

*Example 6.—Poly(isopropylidene-3,3',5,5'tetrachloro-4,4'-diphenylene 4-chloroisophthalate)*

Following the general procedure of Method A of Example 1, 0.0125 mol of 2,2-bis(3,5-dichloro-4-hydroxyphenyl)propane is reacted with 0.0125 mol of 4-chloroisophthaloyl chloride. The product, poly(isopropylidene-3,3',5,5'-tetrachloro-4,4'-diphenylene 4 - chloroisophthalate), has an inherent viscosity of 0.48 and a PMT of 320° C. A film cast from a solution of the polymer in tetrahydrofuran exhibits excellent color stability, no change in the color of the polymer being observed after 200 hours of exposure in the Fade-O-meter.

*Example 7.—Thin film melt preparation of poly(isopropylidene-4,4'-diphenylene 5 - chloroisophthalate) and poly(isopropylidene-4,4'-diphenylene 2-chloroisophthalate)*

A mixture of 2,2-bis(4-hydroxypheny)propane diacetate (22.8 g.), 5-chloroisophthalic acid (20.1 g.), and anhydrous sodium acetate (0.04 g.) is heated, with constant mixing being accomplished by a stream of nitrogen gas. Acetic acid is evolved and, after 7 g. is collected, the reaction mixture is allowed to solidify and is ground up.

The prepolymer so prepared is remelted and an 0.2 mil film of the molten prepolymer is continuously laid on a moving aluminum tape which is passed through an oven maintained at 350° C. The exposure time in the oven is 96 seconds, during which time a sweep of nitrogen gas through the oven is maintained to keep the acetic acid partial pressure below 0.1 mm. of mercury. The product is a colorless, tough, amorphous film which dissolves in trifluoroacetic acid/methylene chloride solvent is found to have an inherent viscosity of 0.5.

A similar polymer is prepared by substituting 20.1 g. of 2-chloroisophthalic acid for the 5-chloroisophthalic acid in the above procedure.

*Example 8.—Polyester of 5-chloroisophthalic acid and phenolphthalein*

Phenolyphthalein (3.18 g.) and 0.80 g. of sodium hydroxide are dissolved in 100 ml. of water, and 1.0 g. of tetraethylammonium chloride is added to the mixture. While the mixture is rapidly stirred, a solution of 2.45 g. of 5-chloroisophthaloyl chloride in 30 ml. 1,2-dichloroethane is added all at once. The blood-red color is quickly reduced to a light pink. Stirring is continued for 4 minutes. 300 ml. of hexane is added to precipitate the polymer, which is filtered and washed with water. The inherent viscosity is 2.05 and the PMT is 390° C. (with decomposition).

*Example 9.—Polyester of 5-chloroisophthalic acid and phenolphthalimidine*

The procedure of Example 8 is repeated, substituting 3.18 g. of phenolphthalimidine for the phenolphthalein. The resulting polymer has in inherent viscosity of 0.41. The PMT is above 400° C. (decomposition beginning at 355° C.).

*Example 10.—Polyester of 5-chloroisophthalic acid and bis(4-hydroxyphenyl)oxindole*

The procedure of Example 8 is repeated, substituting 3.18 g. of bis(4-hydroxyphenol)oxindole for the phenolphthalein. The resulting polymer has an inherent vissocity of 0.26. Decomposition of the polymer is observed at 265° C.

Since many different embodiments of the invention may be made without departing from the spirit and scope

I claim:

A light-stable, fiber-forming linear condensation polyester of chloroisophthalic acid esterified with a bishydroxyphenol compound, greater than 90% of the recurring structural units of the polyester being represented by the formula,

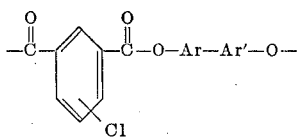

wherein —Ar—Ar'— is a divalent radical selected from the group consisting of isopropylidene-4,4'-diphenylene, isopropylidene-3,3',5,5'-tetrachloro-4,4'-diphenylene and 3,3',5,5'-tetrachloro-4,4'-biphenylene.

References Cited by the Examiner
UNITED STATES PATENTS
3,110,547  11/1963  Emmert _____ 260—75
FOREIGN PATENTS
533,841  6/1957  Belgium.
863,704  3/1961  Great Britain.

WILLIAM H. SHORT, Primary Examiner.
LOUISE P. QUAST, Examiner.